(12) United States Patent
Chen (10) Patent No.: US 8,063,567 B2
(45) Date of Patent: Nov. 22, 2011

(54) LIGHT OUTPUT CONTROL METHOD AND LIGHTING SYSTEM USING THE SAME

(75) Inventor: Tzu-Nan Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 551 days.

(21) Appl. No.: 12/198,206

(22) Filed: Aug. 26, 2008

(65) Prior Publication Data

US 2009/0195166 A1 Aug. 6, 2009

(51) Int. Cl.
*H01J 1/60* (2006.01)
(52) U.S. Cl. ........................ 315/134; 315/158
(58) Field of Classification Search .......... 315/291–307, 315/158, 129–134; 362/802
See application file for complete search history.

(56) References Cited

U.S. PATENT DOCUMENTS

| | | | | |
|---|---|---|---|---|
| 4,305,006 A * | 12/1981 | Walthall et al. | ................. | 307/38 |
| 5,406,173 A * | 4/1995 | Mix et al. | ...................... | 315/156 |
| 5,973,608 A * | 10/1999 | McMahon | ....................... | 341/33 |
| 5,973,996 A * | 10/1999 | Zhevelev et al. | ................. | 367/99 |
| 6,340,864 B1 * | 1/2002 | Wacyk | ........................... | 315/158 |
| 7,025,348 B2 * | 4/2006 | Phinney et al. | ................ | 271/262 |
| 7,399,099 B2 * | 7/2008 | Stokes | .......................... | 362/103 |
| 7,679,221 B2 * | 3/2010 | Kim | .............................. | 307/116 |
| 2005/0216867 A1 * | 9/2005 | Marvit et al. | .................. | 715/863 |
| 2006/0166620 A1 * | 7/2006 | Sorensen | ..................... | 455/41.1 |

FOREIGN PATENT DOCUMENTS

WO   WO 2005073993 A1 *   8/2005

* cited by examiner

*Primary Examiner* — Douglas W Owens
*Assistant Examiner* — Amy Yang
(74) *Attorney, Agent, or Firm* — Thomas, Kayden, Horstemeyer & Risley, LLP (57) ABSTRACT

A light output control method for a lighting system is provided. The lighting system includes a plurality of sensors and a light-emitting unit. The light output control method includes steps of: sensing a motion of an object within the sensing ranges of the sensors at different time spots, thereby generating multiple sensing values; obtaining a sensing sequence data according to the sensing values indicating the motion of the object sensed by the sensors; controlling the light-emitting unit to perform a light output control operation if the sensing sequence data complies with a predetermined condition.

16 Claims, 8 Drawing Sheets

| Hand gesture | Control instruction |
|---|---|
| O | Turn on the light-emitting unit |
| X | Turn off the light-emitting unit |
| C | Enter a light color control mode |
| S | Enter a light strength control mode |
| O+C | Enable the light color control operation |
| O+S | Enable the light strength control operation |
| X+C | Disenable the light color control operation |
| X+S | Disenable the light strength control operation |

FIG.8

LIGHT OUTPUT CONTROL METHOD AND LIGHTING SYSTEM USING THE SAME

FIELD OF THE INVENTION

The present invention relates to a light output control method, and more particularly to a light output control method for a lighting system with multiple sensors.

BACKGROUND OF THE INVENTION

A light emitting diode (LED) is a semiconductor device capable of converting electrical energy into visible light and radiation energy when electrical current flows between the anode and the cathode due to a voltage applied on both terminals of the semiconductor device. When the current passes through the LED in the forward direction, electrons recombine with holes and the extra energy is released in the form of light. The wavelength of the emitted light corresponds to the material and the energy associated with electron-hole pair recombination. The advantages of using the LED include a low operating voltage, low power consumption, high illuminating efficiency, very short response time, pure light color, high structural firmness, high impact resistance, excellent performance reliability, light weight, cost effectiveness, long service life, and so on. Therefore, the incandescent bulbs or mercury vapor lamps used in the conventional lighting system are gradually replaced by LEDs in many applications.

By using three primary color LEDs, for example a combination of red (R), green (G) and blue (B) LEDs, and adjusting the brightness of the LEDs, light output beams with various emission colors can be produced. Generally, the lighting system has a user operation interface (e.g. a button or a knob) or a remote controller. By triggering the user operation interface or using the remote controller, the brightness or the color of the light output from the lighting system can be controlled accordingly.

Figure 1:
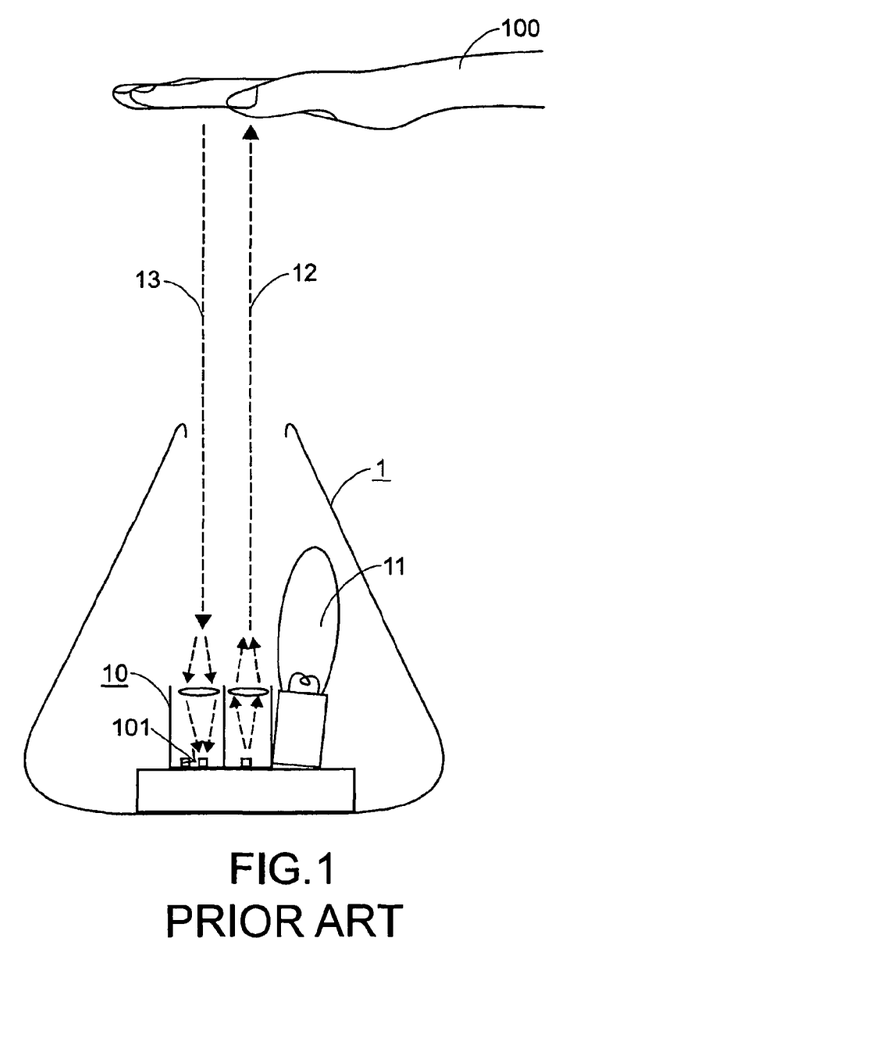
FIG. 1 is a schematic diagram illustrating a lighting system with an infrared transmitting and receiving unit according to the prior art.

Recently, remote controllers become essential components of many kinds of household electrical appliances such as TV sets, DVD players, audio equipments, air conditioners, and so on. That is, the use of remote controllers may facilitate manipulation of these household electrical appliances. Since various kinds of electrical appliances have their own remote controllers, the user is often confused with a lot of remote controllers and the selection of the actual remote controller becomes troublesome. Moreover, too many remote controllers are neither cost-effective nor user-friendly. For reducing the dependence on remote controllers, a lighting system has been developed in WO 2006/056814, which is entitled "PROXIMITY SENSOR DIMMING CONTROL FOR A LIGHT", and the contents of which are hereby incorporated by reference. FIG. 1 is a schematic diagram illustrating a lighting system disclosed in WO 2006/056814. As shown in FIG. 1, the lighting system 1 comprises an infrared transmitting and receiving unit 10 and a light-emitting unit 11. When an object 100 (e.g. a user's hand) is positioned in the sensing range of the infrared transmitting and receiving unit 10, an infrared beam 12 emitted by the infrared transmitting and receiving unit 10 is reflected by the object 100, and the reflected infrared beam 13 is then transmitted to an infrared receiver 101 of the infrared transmitting and receiving unit 10. Generally, the intensity of infrared light 13 reflected from the object 100 and received by the infrared transmitting and receiving unit 10 is dependent on the inverse square of the distance between the infrared transmitting and receiving unit 10 and the object 100. By determining the movement of the object 100 away from or toward the infrared transmitting and receiving unit 10, the brightness or the color of the light output from the light-emitting unit 11 of the lighting system 1 is controlled accordingly.

The approach of controlling the brightness or the color of the output light from the light-emitting unit 11 of the lighting system 1, however, still has some drawbacks. For example, since the intensity of infrared light detected by the infrared transmitting and receiving unit 10 is readily interfered with the background brightness, the detecting accuracy is deteriorated. In addition, the operating range of the infrared transmitting and receiving unit 10 is highly dependent on the intensity of the received infrared light. As known, the operating range is only up to approximately 30 centimeters.

Therefore, there is a need of providing an improved lighting system and a light output control method to obviate the drawbacks encountered from the prior art.

SUMMARY OF THE INVENTION

In accordance with an aspect of the present invention, there is provided a light output control method for a lighting system. The lighting system includes a plurality of sensors and a light-emitting unit. The light output control method includes steps of: sensing a motion of an object within the sensing ranges of the sensors at different time spots, thereby generating multiple sensing values; obtaining a sensing sequence data according to the sensing values indicating the motion of the object sensed by the sensors; controlling the light-emitting unit to perform a light output control operation if the sensing sequence data complies with a predetermined condition.

In accordance with another aspect of the present invention, there is provided a lighting system. The lighting system includes a light-emitting unit, a plurality of sensors and a controlling and processing circuit. The light-emitting unit emits a light. The sensors issue detecting signals and sense a motion of an object within the sensing ranges thereof at different time spots, thereby outputting multiple sensing signals. The controlling and processing circuit is electrically connected to the light-emitting unit and the sensors for triggering the sensors to issue the detecting signals, receiving the sensing signals from the sensors at the different time spots, performing computations of the sensing signals to obtain a plurality of sensing values, generating a sensing sequence data indicating the motion of the object sensed by the sensors according to these sensing values, and controlling the light-emitting unit to perform a light output control operation if the sensing sequence data complies with a predetermined condition.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
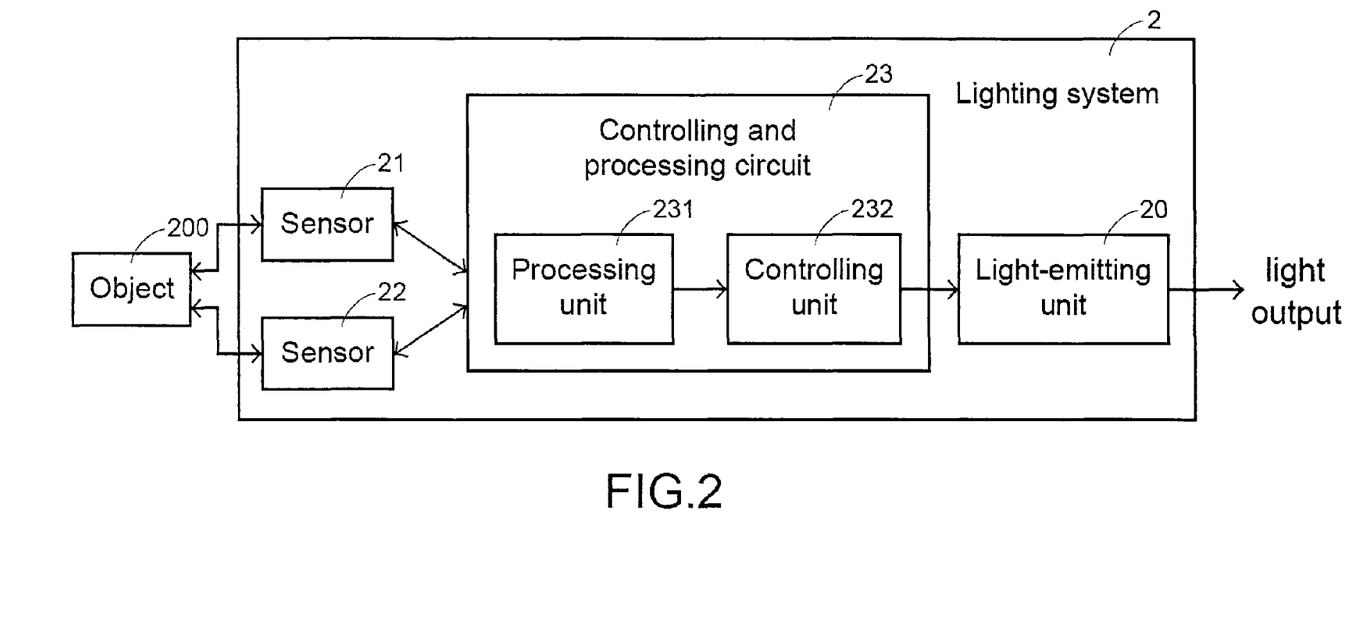
FIG. 2 is a schematic functional block diagram illustrating a lighting system according to a preferred embodiment of the present invention.

FIG. 2 is a schematic functional block diagram illustrating a lighting system according to a preferred embodiment of the present invention. The lighting system 2 of FIG. 2 principally includes a light-emitting unit 20, a plurality of (e.g. two) sensors 21, 22, and a controlling and processing circuit 23. An example of the light-emitting unit 20 includes, but is not limited to, a light emitting diode (LED) for emitting a light beam. The sensors 21 and 22 can periodically issue detecting signals. When an object 200 is positioned in the sensing ranges of the sensors 21 and 22 at different time spots, the sensors 21 and 22 will sense a motion of the object 200 and thus correspondingly issue multiple sensing signals to the controlling and processing circuit 23. The controlling and processing circuit 23 includes a processing unit 231 and a controlling unit 232. The processing unit 231 is electrically connected to the sensors 21 and 22 for triggering the sensors 21 and 22 to issue the detecting signals and receiving the sensing signals from the sensors 21 and 22. These sensing signals from the sensors 21 and 22 are subject to proper computation, thereby obtaining a plurality of sensing values. In accordance with a key feature of the present invention, the processing unit 231 generates a sensing sequence data indicating the motion of the object 200 sensed by the sensors 21 and 22 according to these sensing values. If the sensing sequence data complies with a predetermined condition, a corresponding control signal is transmitted to the controlling unit 232. In response to the control signal, the light-emitting unit 20 performs a light output control operation under control of the controlling unit 232.

In this embodiment, the sensors 21 and 22 included in the lighting system 2 are ultrasonic sensors. The detecting signals issued by the sensors 21 and 22 are ultrasonic signals. These ultrasonic signals are reflected by the object 200 and received by corresponding receivers (not shown) integrated in the ultrasonic sensors 21 and 22. Upon receipt of the reflected ultrasonic signals, the sensors 21 and 22 generate the sensing signals. In the context, the time of the ultrasonic signal emitted from an ultrasonic sensor and reflected by the object to reach the receiver of the ultrasonic sensor is referred as the time of flight (TOF). The processing unit 231 can measure the TOFs associated with these sensing signals issued at different time spots. Moreover, the operating frequencies of the ultrasonic signals emitted from the ultrasonic sensors 21 and 22 may be different. Since the ultrasonic sensors 21 and 22 have different operating frequencies, these ultrasonic signals are no longer interfered with each other and can be accurately detected.

Figure 3:
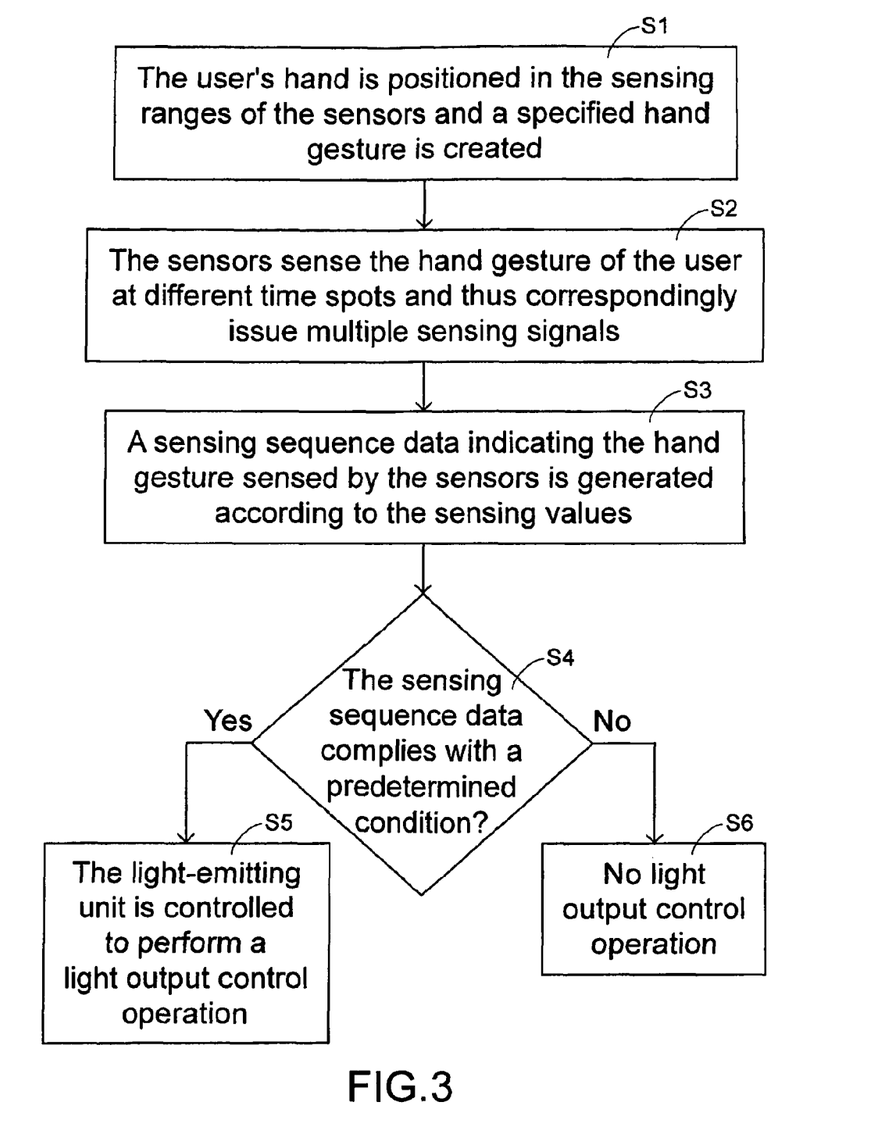
FIG. 3 is a flowchart illustrating a light output control method according to the present invention.

Hereinafter, an embodiment of a light output control method will be illustrated with a flowchart of FIG. 3 as well as the lighting system of FIG. 2. This embodiment is illustrated by referring the user's hand as the object 200 and the hand gesture as the motion of the object 200.

First of all, the user's hand is positioned in the sensing ranges of the sensors 21 and 22 and then a specified hand gesture is created (Step S1). Next, the sensors 21 and 22 sense the hand gesture of the user at different time spots and thus correspondingly issue multiple sensing signals to the controlling and processing circuit 23 (Step S2). According to these sensing values, the processing unit 231 generates a sensing sequence data indicating the hand gesture sensed by the sensors 21 and 22 (Step S3). If the sensing sequence data complies with a predetermined condition (Step S4), a corresponding control signal is transmitted to the controlling unit 232 and the light-emitting unit 20 performs a light output control operation under control of the controlling unit 232 (Step S5). If the sensing sequence data does not comply with a predetermined condition, the light-emitting unit 20 will not perform the light output control operation (Step S6).

From the above description, the lighting system of the present invention has several sensors with different operating frequencies for sensing the motion of the object within the sensing ranges at different time spots. According to the motion of the object, the lighting system will perform a corresponding light output control operation.

Figure 4A:
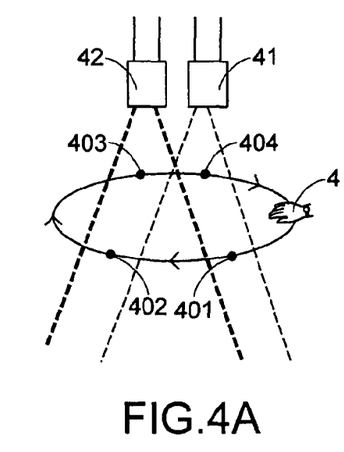
FIGS. 4A and 4B are schematic diagrams illustrating a light output control method according to a first implementation example of the present invention.
Figure 4B:
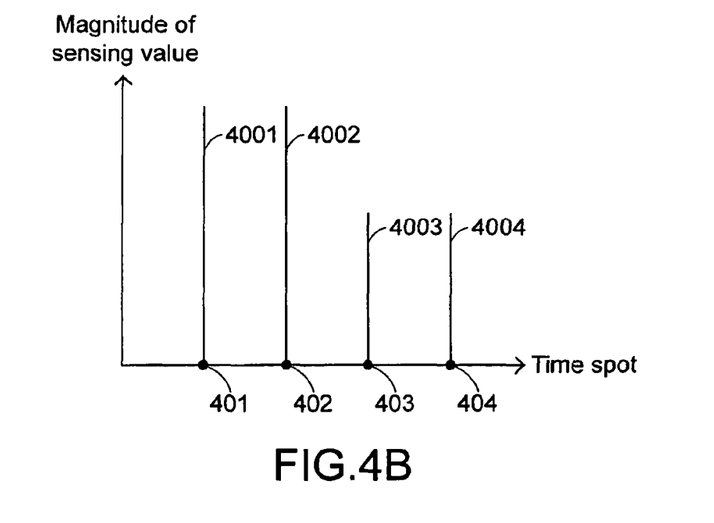

FIGS. 4A and 4B are schematic diagrams illustrating a light output control method according to a first implementation example of the present invention. As shown in FIG. 4A, the user's hand 4 passes through the sensing ranges of the sensors 41 and 42 at a first time spot 401 and a second time spot 402, such that a first sensing value 4001 and a second sensing value 4002 are respectively obtained. Continuously, the user's hand 4 passes through the sensing ranges of the sensors 42 and 41 at a third time spot 403 and a fourth time spot 404, such that a third sensing value 4003 and a fourth sensing value 4004 are respectively obtained. According to sensing values generated at different time spots, a sensing sequence data is obtained and plotted in FIG. 4B. As shown in FIG. 4B, the longitudinal axis represents magnitudes of respective sensing values and transverse axis represents respective time spots. It is found that the sensing value is decreased as the distance between the object and the sensor is decreased. If these sensing values are obtained in the sequence of the first sensing value 4001 (sensor 41), the second sensing value 4002 (sensor 42), the third sensing value 4003 (sensor 42) and the fourth sensing value 4004 (sensor 41), and if the magnitude of the first sensing value 4001 is close to the second sensing value 4002, the magnitude of the third sensing value 4003 is close to the fourth sensing value 4004 and the magnitude of the first sensing value 4001 is greater than the third sensing value 4003, an O-shaped hand gesture is recognized. Under this circumstance, a specified light output control operation is performed so as to turn on the light-emitting unit 20.

Figure 5A:
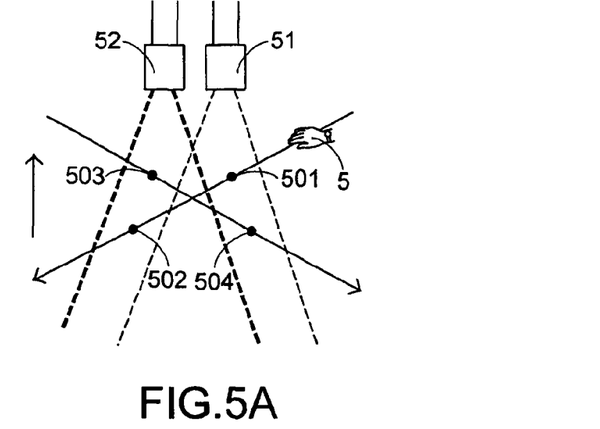
FIGS. 5A and 5B are schematic diagrams illustrating implementation of a light output control method according to a second implementation example of the present invention.
Figure 5B:
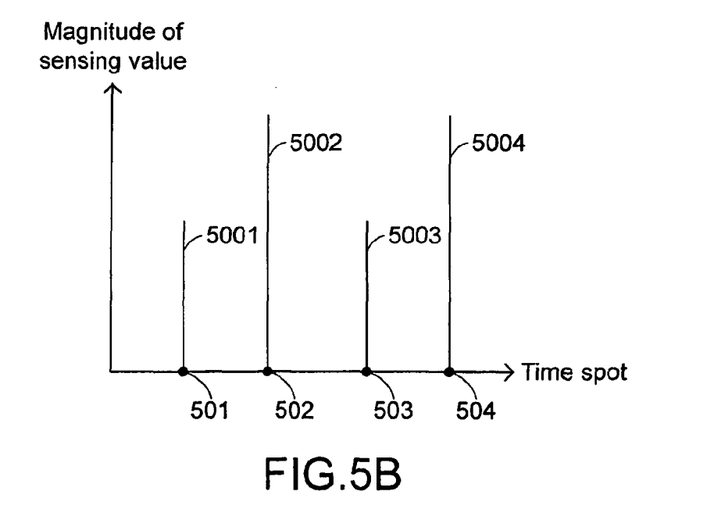

FIGS. 5A and 5B are schematic diagrams illustrating implementation of a light output control method according to a second implementation example of the present invention. As shown in FIG. 5A, the user's hand 5 passes through the sensing ranges of the sensors 51 and 52 at a first time spot 501 and a second time spot 502, such that a first sensing value 5001 and a second sensing value 5002 are respectively obtained. Continuously, the user's hand 5 passes through the sensing ranges of the sensors 52 and 51 at a third time spot 503 and a fourth time spot 504, such that a third sensing value 5003 and a fourth sensing value 5004 are respectively obtained. According to sensing values generated at different time spots, a sensing sequence data is obtained and plotted in FIG. 5B. As shown in FIG. 5B, the longitudinal axis represents magnitudes of respective sensing values and transverse axis represents respective time spots. If these sensing values are obtained in the sequence of the first sensing value 5001 (sensor 51), the second sensing value 5002 (sensor 52), the third sensing value 5003 (sensor 52) and the fourth sensing value 5004 (sensor 51), and if the magnitude of the first sensing value 5001 is smaller than the second sensing value 5002 and the magnitude of the third sensing value 5003 is smaller than the fourth sensing value 5004, an X-shaped hand gesture is recognized. Under this circumstance, a specified light output control operation is performed so as to turn off the light-emitting unit 20.

Figure 6A:
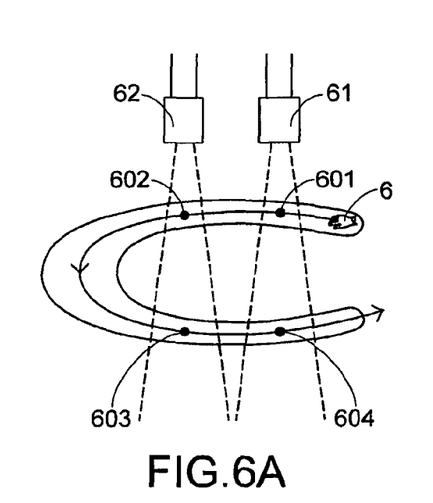
FIGS. 6A and 6B are schematic diagrams illustrating implementation of a light output control method according to a third implementation example of the present invention.
Figure 6B:
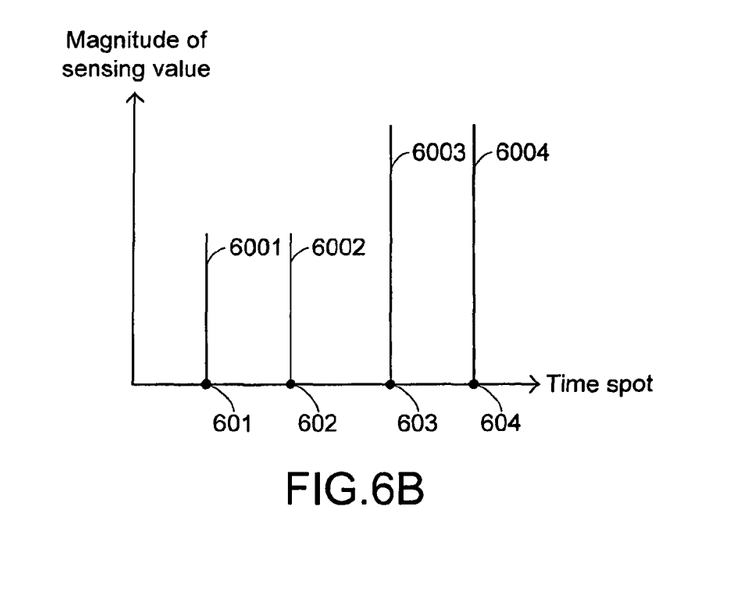

FIGS. 6A and 6B are schematic diagrams illustrating implementation of a light output control method according to a third implementation example of the present invention. As shown in FIG. 6A, the user's hand 6 passes through the sensing ranges of the sensors 61 and 62 at a first time spot 601 and a second time spot 602, such that a first sensing value 6001 and a second sensing value 6002 are respectively obtained. Continuously, the user's hand 6 passes through the sensing ranges of the sensors 62 and 61 at a third time spot 603 and a fourth time spot 604, such that a third sensing value 6003 and a fourth sensing value 6004 are respectively obtained. According to sensing values generated at different time spots, a sensing sequence data is obtained and plotted in FIG. 6B. As shown in FIG. 6B, the longitudinal axis represents magnitudes of respective sensing values and transverse axis represents respective time spots. If these sensing values are obtained in the sequence of the first sensing value 6001 (sensor 61), the second sensing value 6002 (sensor 62), the third sensing value 6003 (sensor 62) and the fourth sensing value 6004 (sensor 61), and if the magnitude of the first sensing value 6001 is close to the second sensing value 6002, the magnitude of the third sensing value 6003 is close to the fourth sensing value 6004 and the magnitude of the first sensing value 6001 is smaller than the third sensing value 6003, a C-shaped hand gesture is recognized. Under this circumstance, a specified light output control operation is performed so as to adjust the light color of the light-emitting unit.

Figure 7A:
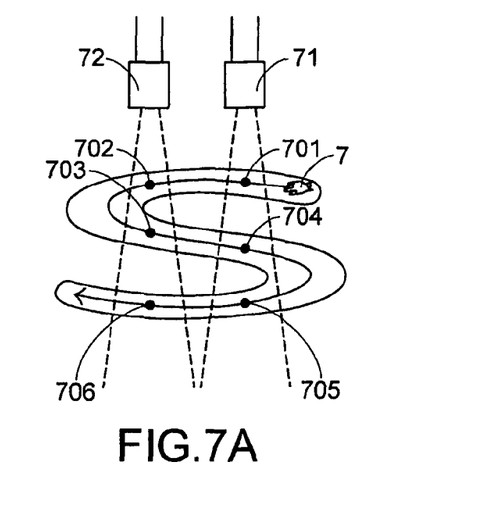
FIGS. 7A and 7B are schematic diagrams illustrating implementation of a light output control method according to a fourth implementation example of the present invention.
Figure 7B:
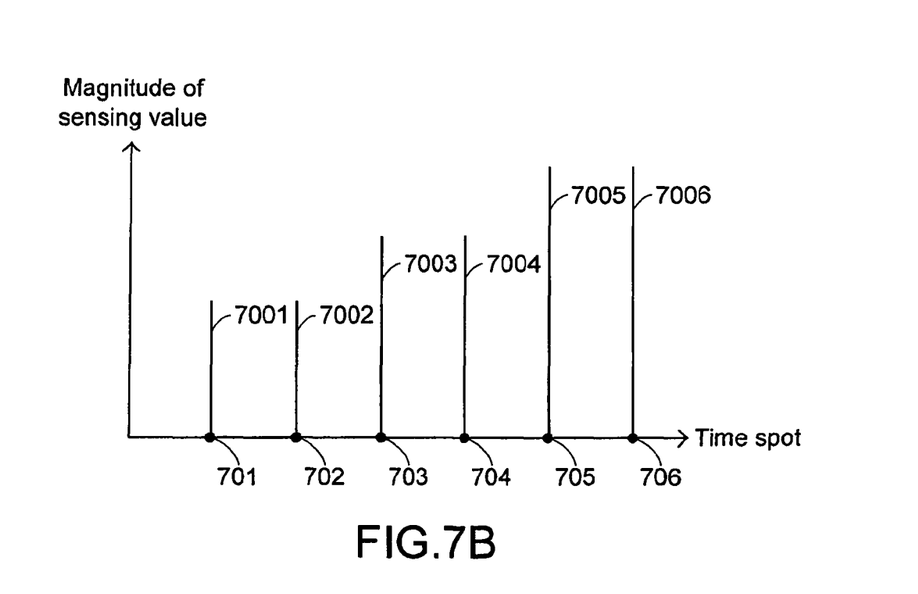

FIGS. 7A and 7B are schematic diagrams illustrating implementation of a light output control method according to a fourth implementation example of the present invention. As shown in FIG. 7A, the user's hand 7 passes through the sensing ranges of the sensors 71 and 72 at a first time spot 701 and a second time spot 702, such that a first sensing value 7001 and a second sensing value 7002 are respectively obtained. Continuously, the user's hand 7 passes through the sensing ranges of the sensors 72 and 71 at a third time spot 703 and a fourth time spot 704, such that a third sensing value 7003 and a fourth sensing value 7004 are respectively obtained. Continuously, the user's hand 7 passes through the sensing ranges of the sensors 71 and 72 at a fifth time spot 705 and a sixth time spot 706, such that a fifth sensing value 7005 and a sixth sensing value 7006 are respectively obtained. According to sensing values generated at different time spots, a sensing sequence data is obtained and plotted in FIG. 7B. As shown in FIG. 7B, the longitudinal axis represents magnitudes of respective sensing values and transverse axis represents respective time spots. If these sensing values are obtained in the sequence of the first sensing value 7001 (sensor 71), the second sensing value 7002 (sensor 72), the third sensing value 7003 (sensor 72), the fourth sensing value 7004 (sensor 71), the fifth sensing value 7005 (sensor 71) and the sixth sensing value 7006 (sensor 72), and if the magnitude of the first sensing value 7001 is close to the second sensing value 7002, the magnitude of the third sensing value 7003 is close to the fourth sensing value 7004, the magnitude of the fifth sensing value 7005 is close to the sixth sensing value 7006, the magnitude of the first sensing value 7001 is smaller than the third sensing value 7003 and the magnitude of the third sensing value 7003 is smaller than the fifth sensing value 7005, an S-shaped hand gesture is recognized. Under this circumstance, a specified light output control operation is performed so as to adjust the light strength of the light-emitting unit.

Figure 8:
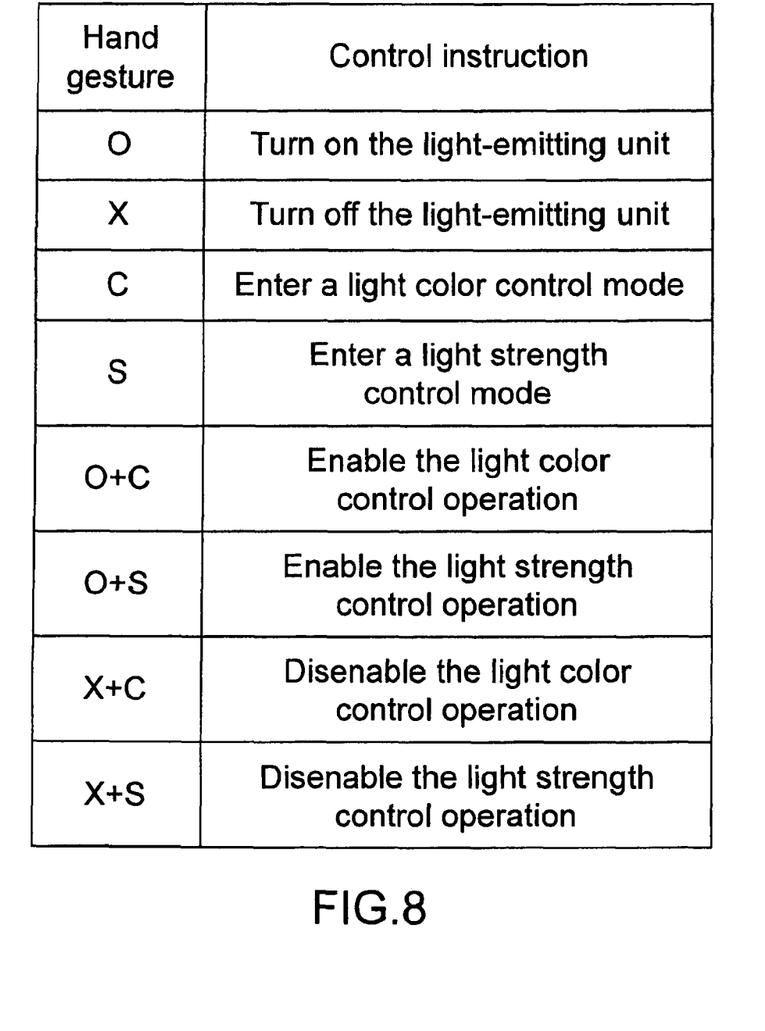
FIG. 8 is a look-up table correlating the hand gestures to a set of control instructions for controlling the light color and the light strength of the lighting system.

FIG. 8 is a look-up table correlating the hand gestures to a set of control instructions for controlling the light color and the light strength of the lighting system. For example, in response to the O-shaped hand gesture, the light-emitting unit is turned on. In response to the X-shaped hand gesture, the light-emitting unit is turned off. In response to the C-shaped hand gesture, the light color of the light-emitting unit is adjustable. In response to the S-shaped hand gesture, the light strength of the light-emitting unit is adjustable. If the O-shaped hand gesture and the C-shaped hand gesture are successively created, the light color control operation is enabled. If the O-shaped hand gesture and the S-shaped hand gesture are successively created, the light strength control operation is enabled. If the X-shaped hand gesture and the C-shaped hand gesture are successively created, the light color control operation is disenabled. If the X-shaped hand gesture and the S-shaped hand gesture are successively created, the light strength control operation is disenabled.

In the above embodiments, the present invention is illustrated by referring to two sensors. It is noted that, however, those skilled in the art will readily observe that numerous modifications and alterations may be made while retaining the teachings of the invention. For example, the lighting system of the present invention can include more than two sensors.

From the above description, the lighting system of the present invention has several ultrasonic sensors for sensing the motion of the object within the sensing ranges. According to the motion of the object, the lighting system will perform a corresponding light output control operation. In addition, since the ultrasonic signal is minimally interfered with the background brightness or background noise, the detecting accuracy is enhanced.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light output control method for a lighting system, the lighting system comprising a plurality of sensors and a light-emitting unit, wherein the sensors include a first sensor and a second sensor with different operating frequencies, the light output control method comprising steps of:

sensing a motion of an object within the sensing ranges of the sensors at different time spots, thereby generating multiple sensing values, wherein the motion of the object is a hand gesture of a user;

obtaining a sensing sequence data according to the sensing values indicating the motion of the object sensed by the sensors, wherein the contents of the sensing sequence data include a first sensing value obtained at a first time spot when the object passes through the first sensor, a second sensing value obtained at a second time spot when the object passes through the second sensor, a third sensing value obtained at a third time spot when the object passes through the second sensor and a fourth sensing value obtained at a fourth time spot when the object passes through the first sensor; and controlling the light-emitting unit to perform a light output control operation if the sensing sequence data complies with a predetermined condition, wherein if the first sensing value, the second sensing value, the third sensing value and the fourth sensing value are sequentially obtained, and if the magnitude of the first sensing value is close to the second sensing value, the magnitude of the third sensing value is close to the fourth sensing value and the magnitude of the first sensing value is greater than the third sensing value, an O-shaped hand gesture is recognized such that the light-emitting unit is turned on to generate a light output.

2. The light output control method according to claim 1 wherein no light output control operation is performed by the light-emitting unit if the sensing sequence data fails to comply with the predetermined condition.

3. The light output control method according to claim 1 wherein the sensors of the lighting system are ultrasonic sensors for issuing ultrasonic signals, and the ultrasonic signals are reflected by the object and received by corresponding receivers integrated in the ultrasonic sensors, such that the sensing values are obtained at the different time spots.

4. The light output control method according to claim 3 wherein each of the sensing values indicates the time of the ultrasonic signal emitted from a corresponding ultrasonic sensor and reflected by the object to reach the receiver of the ultrasonic sensor.

5. The light output control method according to claim 1 wherein the light-emitting unit of the lighting system is a light emitting diode.

6. A light output control method for a lighting system, the lighting system comprising a plurality of sensors and a light-emitting unit, wherein the sensors include a first sensor and a second sensor with different operating frequencies, the light output control method comprising steps of:

sensing a motion of an object within the sensing ranges of the sensors at different time spots, thereby generating multiple sensing values, wherein the motion of the object is a hand gesture of a user;

obtaining a sensing sequence data according to the sensing values indicating the motion of the object sensed by the sensors, wherein the contents of the sensing sequence data include a first sensing value obtained at a first time spot when the object passes through the first sensor, a second sensing value obtained at a second time spot when the object passes through the second sensor, a third sensing value obtained at a third time spot when the object passes through the second sensor and a fourth sensing value obtained at a fourth time spot when the object passes through the first sensor; and controlling the light-emitting unit to perform a light output control operation if the sensing sequence data complies with a predetermined condition, wherein if the first sensing value, the second sensing value, the third sensing value and the fourth sensing value are sequentially obtained, and if the magnitude of the first sensing value is smaller than the second sensing value and the magnitude of the third sensing value is smaller than the fourth sensing value, an X-shaped hand gesture is recognized such that the light-emitting unit is turned off to interrupt the light output.

7. A light output control method for a lighting system, the lighting system comprising a plurality of sensors and a light-emitting unit, wherein the sensors include a first sensor and a second sensor with different operating frequencies, the light output control method comprising steps of:

sensing a motion of an object within the sensing ranges of the sensors at different time spots, thereby generating multiple sensing values, wherein the motion of the object is a hand gesture of a user;

obtaining a sensing sequence data according to the sensing values indicating the motion of the object sensed by the sensors, wherein the contents of the sensing sequence data include a first sensing value obtained at a first time spot when the object passes through the first sensor, a second sensing value obtained at a second time spot when the object passes through the second sensor, a third sensing value obtained at a third time spot when the object passes through the second sensor and a fourth sensing value obtained at a fourth time spot when the object passes through the first sensor; and controlling the light-emitting unit to perform a light output control operation if the sensing sequence data complies with a predetermined condition, wherein if the first sensing value, the second sensing value, the third sensing value and the fourth sensing value are sequentially obtained, and if the magnitude of the first sensing value is close to the second sensing value, the magnitude of the third sensing value is close to the fourth sensing value and the magnitude of the first sensing value is smaller than the third sensing value, a C-shaped hand gesture is recognized such that the light color of the light-emitting unit is adjustable.

8. A light output control method for a lighting system, the lighting system comprising a plurality of sensors and a light-emitting unit, wherein the sensors include a first sensor and a second sensor with different operating frequencies, the light output control method comprising steps of:

sensing a motion of an object within the sensing ranges of the sensors at different time spots, thereby generating multiple sensing values, wherein the motion of the object is a hand gesture of a user;

obtaining a sensing sequence data according to the sensing values indicating the motion of the object sensed by the sensors, wherein the contents of the sensing sequence data include a first sensing value obtained at a first time spot when the object passes through the first sensor, a second sensing value obtained at a second time spot when the object passes through the second sensor, a third sensing value obtained at a third time spot when the object passes through the second sensor, a fourth sensing value obtained at a fourth time spot when the object passes through the first sensor, a fifth sensing value obtained at a fifth time spot when the object passes through the first sensor and a sixth sensing value obtained at a sixth time spot when the object passes through the second sensor; and controlling the light-emitting unit to perform a light output control operation if the sensing sequence data complies with a predetermined condition, wherein if the first sensing value, the second sensing value, the third sensing value and the fourth sensing value, the fifth sensing value and the sixth sensing value are sequentially obtained, and if the magnitude of the first sensing value is close to the second sensing value, the magnitude of the third sensing value is close to the fourth sensing value, the magnitude of the fifth sensing value is close to the sixth sensing value, the magnitude of the first sensing value is smaller than the third sensing value and the magnitude of the third sensing value is smaller than the fifth sensing value, an S-shaped hand gesture is recognized such that the light strength of the light-emitting unit is adjustable.

9. A lighting system comprising:
a light-emitting unit for emitting a light;
a plurality of sensors for issuing detecting signals and sensing a motion of an object within the sensing ranges thereof at different time spots, thereby outputting multiple sensing signals, wherein the sensors include a first sensor and a second sensor with different operating frequencies, and the motion of the object is a hand gesture of a user; and
a controlling and processing circuit electrically connected to the light-emitting unit and the sensors for triggering the sensors to issue the detecting signals, receiving the sensing signals from the sensors at the different time spots, performing computations of the sensing signals to obtain a plurality of sensing values, generating a sensing sequence data indicating the motion of the object sensed by the sensors according to these sensing values, and controlling the light-emitting unit to perform a light output control operation if the sensing sequence data complies with a predetermined condition, wherein the controlling and processing circuit comprises:
a processing unit electrically connected to the sensors for triggering the sensors to issue the detecting signals, receiving the sensing signals from the sensors at the different time spots, performing computations on the sensing signals to obtain the sensing values, generating the sensing sequence data indicating the motion of the object sensed by the sensors according to these sensing values, and outputting a control signal if the sensing sequence data complies with the predetermined condition; and
a controlling unit electrically connected to the processing unit and the light-emitting unit for controlling the light-emitting unit to perform the light output control operation in response to the control signal.

10. The lighting system according to claim 9 wherein the light-emitting unit of the lighting system is a light emitting diode.

11. The lighting system according to claim 9 wherein the sensors are ultrasonic sensors for issuing ultrasonic signals, and the ultrasonic signals are reflected by the object and received by corresponding receivers integrated in the ultrasonic sensors, such that the sensing values are obtained at the different time spots.

12. The lighting system according to claim 9 wherein each of the first sensing value and the second sensing value indicates the time of the ultrasonic signal emitted from a corresponding ultrasonic sensor and reflected by the object to reach the receiver of the ultrasonic sensor.

13. The lighting system according to claim 9 wherein the contents of the sensing sequence data generated by the controlling and processing circuit include a first sensing value obtained at a first time spot when the object passes through the first sensor, a second sensing value obtained at a second time spot when the object passes through the second sensor, a third sensing value obtained at a third time spot when the object passes through the second sensor and a fourth sensing value obtained at a fourth time spot when the object passes through the first sensor, wherein if the first sensing value, the second sensing value, the third sensing value and the fourth sensing value are sequentially obtained, and if the magnitude of the first sensing value is close to the second sensing value, the magnitude of the third sensing value is close to the fourth sensing value and the magnitude of the first sensing value is greater than the third sensing value, an O-shaped hand gesture is recognized such that the light-emitting unit is turned on to generate a light output.

14. The lighting system according to claim 9 wherein the contents of the sensing sequence data generated by the controlling and processing circuit include a first sensing value obtained at a first time spot when the object passes through the first sensor, a second sensing value obtained at a second time spot when the object passes through the second sensor, a third sensing value obtained at a third time spot when the object passes through the second sensor and a fourth sensing value obtained at a fourth time spot when the object passes through the first sensor, wherein if the first sensing value, the second sensing value, the third sensing value and the fourth sensing value are sequentially obtained, and if the magnitude of the first sensing value is smaller than the second sensing value and the magnitude of the third sensing value is smaller than the fourth sensing value, an X-shaped hand gesture is recognized such that the light-emitting unit is turned off to interrupt the light output.

15. The lighting system according to claim 9 wherein the contents of the sensing sequence data generated by the controlling and processing circuit include a first sensing value obtained at a first time spot when the object passes through the first sensor, a second sensing value obtained at a second time spot when the object passes through the second sensor, a third sensing value obtained at a third time spot when the object passes through the second sensor and a fourth sensing value obtained at a fourth time spot when the object passes through the first sensor, wherein if the first sensing value, the second sensing value, the third sensing value and the fourth sensing value are sequentially obtained, and if the magnitude of the first sensing value is close to the second sensing value, the magnitude of the third sensing value is close to the fourth sensing value and the magnitude of the first sensing value is smaller than the third sensing value, a C-shaped hand gesture is recognized such that the light color of the light-emitting unit is adjustable.

16. The lighting system according to claim 9 wherein the contents of the sensing sequence data generated by the controlling and processing circuit include a first sensing value obtained at a first time spot when the object passes through the first sensor, a second sensing value obtained at a second time spot when the object passes through the second sensor, a third sensing value obtained at a third time spot when the object passes through the second sensor, a fourth sensing value obtained at a fourth time spot when the object passes through the first sensor, a fifth sensing value obtained at a fifth time spot when the object passes through the first sensor and a sixth sensing value obtained at a sixth time spot when the object passes through the second sensor, wherein if the first sensing value, the second sensing value, the third sensing value and the fourth sensing value, the fifth sensing value and the sixth sensing value are sequentially obtained, and if the magnitude of the first sensing value is close to the second sensing value, the magnitude of the third sensing value is close to the fourth sensing value, the magnitude of the fifth sensing value is close to the sixth sensing value, the magnitude of the first sensing value is smaller than the third sensing value and the magnitude of the third sensing value is smaller than the fifth sensing value, an S-shaped hand gesture is recognized such that the light strength of the light-emitting unit is adjustable.

* * * * *